United States Patent
Teller et al.

(10) Patent No.: US 9,686,307 B2
(45) Date of Patent: Jun. 20, 2017

(54) METHOD AND SYSTEM FOR DESTROYING BROWSER-BASED MEMORY CORRUPTION VULNERABILITIES

(71) Applicant: CHECK POINT SOFTWARE TECHNOLOGIES LTD., Tel Aviv (IL)

(72) Inventors: Tomer Teller, Tel Aviv (IL); Adi Hayon, Givatayim (IL)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 19 days.

(21) Appl. No.: 14/595,239

(22) Filed: Jan. 13, 2015

(65) Prior Publication Data

US 2016/0205130 A1    Jul. 14, 2016

(51) Int. Cl.
| | | |
|---|---|---|
| G06F 21/00 | (2013.01) | |
| H04L 29/06 | (2006.01) | |
| H04L 29/08 | (2006.01) | |

(52) U.S. Cl.
CPC ...... *H04L 63/1441* (2013.01); *H04L 63/0281* (2013.01); *H04L 63/145* (2013.01); *H04L 63/1458* (2013.01); *H04L 67/02* (2013.01); *H04L 67/28* (2013.01); *H04L 67/2842* (2013.01); *H04L 67/42* (2013.01); *H04L 2463/145* (2013.01)

(58) Field of Classification Search
CPC . H04L 67/02; H04L 63/0227; H04L 63/0272; H04L 63/0281; H04L 63/166; H04L 63/20; H04L 67/28; H04L 67/2842; H04L 67/2804; H04L 67/2819; H04L 63/145; G06F 2209/5016; G06F 9/5027
USPC ........................................................ 726/22
See application file for complete search history.

(56) References Cited

U.S. PATENT DOCUMENTS

| | | | |
|---|---|---|---|
| 6,463,583 B1* | 10/2002 | Hammond | G06F 9/44521 714/E11.207 |
| 8,272,059 B2 | 9/2012 | Freeman | |
| 8,578,499 B1* | 11/2013 | Zhu | G06F 21/567 713/154 |
| 8,752,183 B1* | 6/2014 | Heiderich | G06F 21/577 726/22 |
| 2008/0016314 A1* | 1/2008 | Li | G06F 21/554 711/200 |
| 2009/0099422 A1 | 4/2009 | George | |
| 2009/0157875 A1* | 6/2009 | Britton | H04L 43/00 709/224 |
| 2010/0162398 A1 | 6/2010 | Karecha et al. | |
| 2010/0218253 A1* | 8/2010 | Sutton | G06F 21/554 726/23 |
| 2011/0030060 A1 | 2/2011 | Kejriwal | |
| 2011/0277027 A1* | 11/2011 | Hayton | H04L 63/0884 726/8 |

FOREIGN PATENT DOCUMENTS

WO    2010069904    6/2010

* cited by examiner

*Primary Examiner* — William Powers
(74) *Attorney, Agent, or Firm* — Mark M. Friedman

(57) ABSTRACT

Client-less methods and systems destroy/break the predictive layout of, for example, a client computer memory. The methods and systems operate by injecting a library that manipulates the client computer memory during exploitation attempts.

14 Claims, 7 Drawing Sheets

```
0:006> s 0c0c0c0c L1000 24 4e 9f 22
0c0c104e    24 4e 9f 22 fd b0 25 35-92 7f 15 87
0:006> dd 0c0c104e-16 L100
0c0c1038    90909090 90909090 90909090 90909090
0c0c1048    90909090 4e249090 b0fd229f 7f923525
0c0c1058    e3f68715 b34f767b 4870bb2c 37737e77
0c0c1068    7804e230 a843d539 e0889098 d4137205
0c0c1078    022461499 6734e1d0 66a9b13f 0c78f884
0c0c1088    197df586 9bb6b5f9 32721d77 40e0d1d2
0c0c1098    97427cb4 c128e381 794976d6 b94a7b3c
0c0c10a8    b7932d75 9bb81c74 3a7f4a7a 127e37e2
0c0c10b8    98b543eb 2b73bfd5 b6bb48f5 05464b8d
0c0c10c8    15b03570 34b42496 b314ba40 91fd6b66
0c0c10d8    d62ab199 90a9d485 beb8922d 1c49b73c
0c0c10e8    b90c7141 4e1d67f9 b23d4725 04e11193
0c0c10f8    422f4f9f a8f83f2c dadafc97 1aac1cbb
0c0c1108    2474d9e5 c92b5ef4 5e314ab1 fcee8318
0c0c1118    4e085e03 daf464ef 1e0b98e2 dff3e1ea
0c0c1128    3a7a8deb 4e189fda 026b104f b739db7c
0c0c1138    b895a9f7 f7c304b0 54cba941 a6b7ab81
0c0c1148    68860bd6 95cf4d2b d2981fc4 a7adb077
0c0c1158    37fd3b4b 36b7d8cc 60cc4efd 190171dd
0c0c1168    22466a54 d0bc012e 198dc3b1 24412b80
0c0c1178    6098a62c 9aef598b 58f7e4ef 7d72328d
0c0c1188    a524b035 2eb215c7 69b1d2cb 0216e5c8
```

FIG. 4A

```
0:006> s 0c0c0c0c L1000 24 4e 9f 22
0c0c104e    24 4e 9f 22 fd b0 25 35-92 7f 15 87
0:006> dd 0c0c104e-16 L100
0c0c1038    15b03570 34b42496 b314ba40 91fd6b66
0c0c1048    d62ab199 90a9d485 beb8922d 1c49b73c
0c0c1058    b90c7141 4e1d67f9 b23d4725 04e11193
0c0c1068    422f4f9f a8f83f2c dadafc97 1aac1cbb
0c0c1078    2474d9e5 c92b5ef4 5e314ab1 fcee8318
0c0c1088    4e085e03 daf464ef 1e0b98e2 dff3e1ea
0c0c1098    3a7a8deb 4e189fda 026b104f b739db7c
0c0c10a8    b895a9f7 f7c304b0 54cba941 a6b7ab81
0c0c10b8    68860bd6 95cf4d2b d2981fc4 a7adb077
0c0c10c8    37fd3b4b 36b7d8cc 60cc4efd 190171dd
0c0c10d8    22466a54 d0bc012e 198dc3b1 24412b80
0c0c10e8    6098a62c 9aef598b 58f7e4ef 7d72328d
0c0c10f8    a524b035 2eb215c7 69b1d2cb 0216e5c8
0c0c1108    90909090 90909090 90909090 90909090
0c0c1118    90909090 4e249090 b0fd229f 7f923525
0c0c1128    e3f68715 b34f767b 4870bb2c 37737e77
0c0c1138    7804e230 a843d539 e0889098 d4137205
0c0c1148    02461499 6734e1d0 66a9b13f 0c78f884
0c0c1158    197df586 9bb6b5f9 32721d77 40e0d1d2
0c0c1168    97427cb4 c128e381 794976d6 b94a7b3c
0c0c1178    b7932d75 9bb81c74 3a7f4a7a 127e37e2
0c0c1188    98b543eb 2b73bfd5 b6bb48f5 05464b8d
```

FIG. 4B

METHOD AND SYSTEM FOR DESTROYING BROWSER-BASED MEMORY CORRUPTION VULNERABILITIES

TECHNICAL FIELD

The present invention relates to controlling browser based memory corruptors and negating their harmful effects from compromising computers.

BACKGROUND

Browser exploitation is the leading cause for the spread of malware across the web. FIGS. 1A and 1B, for example, show a typical scenario, in the form of a flow diagram (FIG. 1A) and a graphical representation of this flow diagram (FIG. 1B), for a user computer becoming compromised when its browsing application comes into data communication with an exploit.

Throughout this document an "exploit," includes software and software tools, such as a chunk of data, code, code segment, or a sequence of commands that takes advantage of a bug, glitch or vulnerability in order to cause unintended or unanticipated behavior to occur on computer software, hardware, or electronic device (usually computerized). Such behavior frequently includes, for example, gaining control of a computer system, allowing privilege escalation, a denial-of-service attack, or installing malware. Also, throughout this document, "exploits," "exploited," "exploitation", and all of the other similar terms based derivates of "exploit," including computer hardware, software or both, which has been subjected to an "exploit."

In FIG. 1A, at block 10, a user, via his browser 20 in his computer (not shown) (FIG. 1B), the computer being, for example, a conventional desktop computer, a laptop computer, tablet computer, such as an ipad® from Apple, a smart phone, or the like, directs the browsing application associated with the user computer, browsing applications or browsers being for example, Internet Explorer™ from Microsoft, Chrome™ from Google, and Firefox™ from Mozilla to a website (e.g., web page of the web site) containing an exploit, by making an HTTP (Hypertext Transfer Protocol) request 22. This browser 20 direction is commonly known as "surfing." This HTTP request is received by the computer 24, server or the like, which hosts the web site to which the browser 20 has been directed.

The web site includes an exploit 26. The web site host computer transmits an HTTP response 28 to the browsing application 20 of the user's computer. The exploit the travels over the network in this HTTP response, to the browser 20 (associated with the user's computer).

Once received by the browser 20 of the user computer, the exploit (represented now as 26') manipulates the memory and causes various triggering of events in the computer, typically those that are uninitiated by the user, unintended and which cause damage to the user's computer, at block 12. As a result of the exploit triggering (activating) in the user's computer, the computer is compromised, at block 14. The user computer is, for example, damaged in both hardware and software components, typically including its memory and storage media.

As a result, endpoint-based exploit mitigation technologies were developed to increase the difficulty in these types of exploitations. While these tools have been proven to work in the field, the endpoint-based technologies are difficult to 1) manage, 2) configure, and 3) deploy, particularly in large organizations due to their invasive nature. Additionally, these exploit mitigation technologies must be installed on computers as part of a software package. Such software packages must be maintained, installed, managed and updated by system administrators, adding additional soft costs to the hard costs of the purchase price of the software. Even when installed, the software can be detected by the exploits. The software is also such that kernel based vulnerabilities can evade it, and there are always compatibility issues with the software itself. Moreover, the user experience is affected because operation of the mitigation software/system affects the operation of the browsing session. Accordingly, the user experience is diminished, or simply ruined, until the danger is mitigated.

Attackers typically attack browser based memory corruptions by designing exploits which function to organize and manipulate the memory (heap) layout in a specific and predictive way. By "heap" it is meant, throughout this document, that there is a common pool of memory from which memory is allocated dynamically.

This layout manipulation technique is called "Heap Feng Shui" and there exists libraries such as HeapLib that automate that process: V1.0 http://www.phreedom.org/research/heap-feng-shui/; and, V2.0 http://blog.ioactive.com/2013/11/heaplib-20.html, for example.

SUMMARY

Embodiments of the present invention are directed to methods and systems for destroying/breaking browser-based memory corruption vulnerabilities. This network-based system works by injecting a JavaScript library into an HTTP(S) (HTTP meaning Hypertext Transfer Protocol, and HTTPS meaning Hypertext Transfer Protocol Secure, with the term "HTTP(S)" meaning "HTTP and/or HTTPS"), which in return, overloads key JavaScript functions/structures in order to subvert the content that is written into the memory in the heap, for example, subverting memory content. By manipulating the memory during exploitation, the library, for example, breaks exploit predictability.

Embodiments of the invention are directed to client-less methods and systems destroy/break the predictive layout of, for example, a client computer memory. The methods and systems operate by injecting a library that manipulates the client computer memory during exploitation attempts, or in other words, the library manipulates the manipulator.

Embodiments of the present invention are directed to methods and systems that destroy/break the predictive layout of, for example, a client computer memory. The invention does so by injecting a library that manipulates the memory during exploitation attempts.

Embodiments of the present invention are client-less, in that they work without installing an end point client, to mitigate dangers, including exploits. Accordingly, these client-less mitigations solutions, are embodied in hardware and/or software, and operate, for example, in the background, preserving the user experience.

Embodiments of the present invention provide methods and systems that take advantage of the fact that: 1) exploits interact directly to the memory of the user's computer to compromise it; and, 2) attackers assume that certain code is in the memory at a certain location, when designing their exploits, malware and other attacking code.

Embodiments of the present invention operate based on, for example, the knowledge that exploiting memory corruption vulnerabilities requires a certain memory state. By manipulating the memory state, the present invention destroys or breaks the exploit. To operate in this manner, the invention takes the approach that all web sites are potentially dangerous. To counter this approach, the invention installs a network proxy, such as a proxy server, that monitors HTTP(S), and rewrites all HTTP(S) responses to include a JavaScript library. The JavaScript library is such that exploits directed to attacking the memory layout, of a web page downloading user's computer are destroyed or broken, while the user experience at the web page and associated web site, and the performance of the web page or web site is preserved, to a point where the user does not recognize the processes occurring and software executing in his computer.

Embodiments of the invention are directed to a method for preventing browser-based memory corruption in computers. The method comprises: monitoring HTTP (Hypertext Transfer Protocol) responses transmitted over a network from a web page to which the browser associated with a computer has been directed; and, injecting a library to modify the HTTP response to mitigate attacks on the memory of the computer.

Optionally, the HTTP response includes at least one of an HTTP response or an HTTPS (Hypertext Transfer Protocol Secure) response.

Optionally, the injected library hooks predetermined functions in the HTTP response.

Optionally, the library includes a javascript library.

Optionally, the injecting the library is performed by a proxy.

Optionally, when the hooked function is a SET function, the memory is manipulated; and, when the hooked function is a GET function, the memory is repaired.

Optionally, the memory is manipulated with manipulations selected from the group consisting of bit flipping, string reordering, array swapping, and asynchronous defragmentation.

Optionally, the memory is repaired includes the memory being restored.

Embodiments of the invention are directed to a computer usable non-transitory storage medium having a computer program embodied thereon for causing a suitable programmed system to preventing browser-based memory corruption in computers accessible via a network, by performing the following steps when such program is executed on the system. The steps comprise: monitoring HTTP responses transmitted over a network from a web page to which the browser associated with a computer, accessible via the network, has been directed; and, injecting a library to modify the HTTP response to mitigate attacks on the memory of the computer.

Optionally, the HTTP response includes at least one of an HTTP response or and HTTPS response.

Optionally, the injected library hooks predetermined functions in the HTTP response.

Optionally, the library includes a javascript library.

Optionally, when the hooked function is a SET function, the memory of the computer is manipulated, and when the hooked function is a GET function, the memory of the computer is repaired.

Optionally, the memory manipulations are selected from the group consisting of bit flipping, string reordering, array swapping, and asynchronous defragmentation.

Optionally, the memory repaired includes the memory being restored.

Embodiments of the invention are directed to a server for linking to a network, the server for preventing browser-based memory corruption in client computers linked to the network. The server comprises: at least one library to modify at least one of an HTTP response or an HTTPS response, sent to a client computer over the network, to mitigate attacks on the memory of the client computer; and, a processor for executing computer components. The computer components comprise: a first component for intercepting at least one of an HTTP response or an HTTPS response, sent to a client computer over the network; and, a second component for injecting the at least one library into the at least one HTTP response or an HTTPS response.

Optionally, the library hooks predetermined functions in the at least one HTTP or HTTPS response.

Optionally, the library includes a javascript library.

Optionally, the server is configured for operating as a proxy.

Throughout this document, a "web site" is a related collection of World Wide Web (WWW) files that includes a beginning file or "web page" called a home page, and typically, additional files or "web pages." The term "web site" is used collectively to include "web site" and "web page(s)."

Throughout this document, a "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., Smartphone, personal digital assistant (PDA), mobile telephone or cellular telephone).

Throughout this document, a server is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based emulation of a computer.

Throughout this document, HTTP (Hypertext Transfer Protocol) and HTTPS (Hypertext Transfer Protocol Secure) is an application protocol for distributed, collaborative, hypermedia information systems. Hypertext is structured text that uses logical links (hyperlinks) between nodes containing text. HTTP is the protocol to exchange or transfer hypertext. Throughout this document, "HTTP(S)" is a term used for Hypertext Transfer Protocol and/or Hypertext Transfer Protocol Secure.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DETAILED DESCRIPTION OF THE DRAWINGS

Figure 1A:
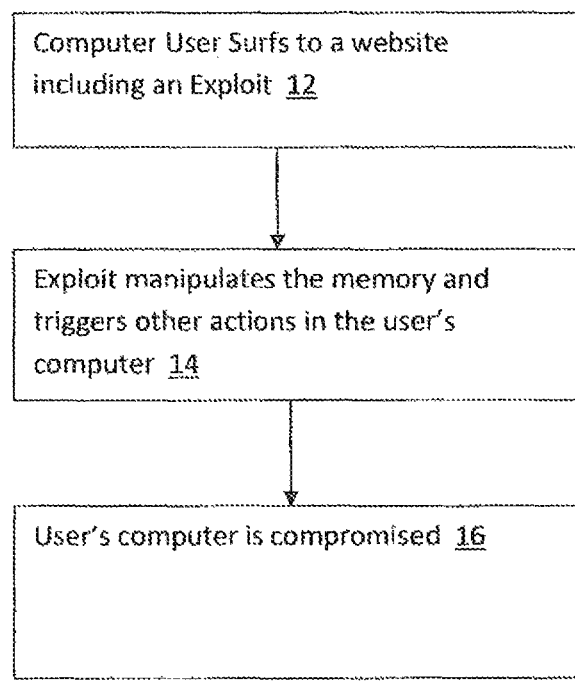
FIG. 1A is a flow diagram detailing how a user's computer becomes compromised by an exploit.
Figure 1B:
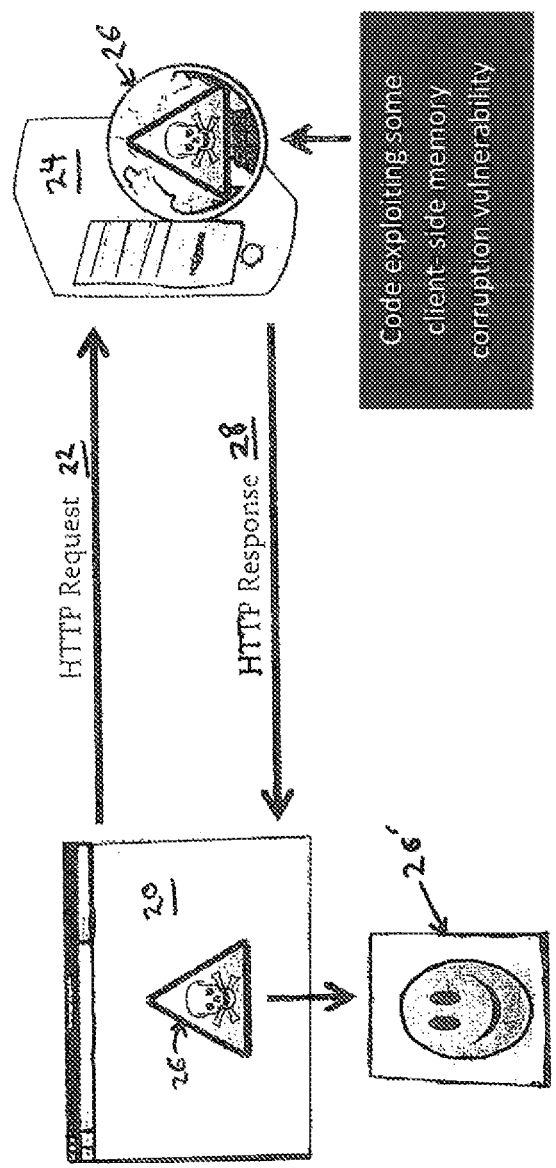
FIG. 1B is a diagram showing operation of the exploit detailed in FIG. 1A.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable (storage) medium(s) having computer readable program code embodied thereon.

Figure 2A:
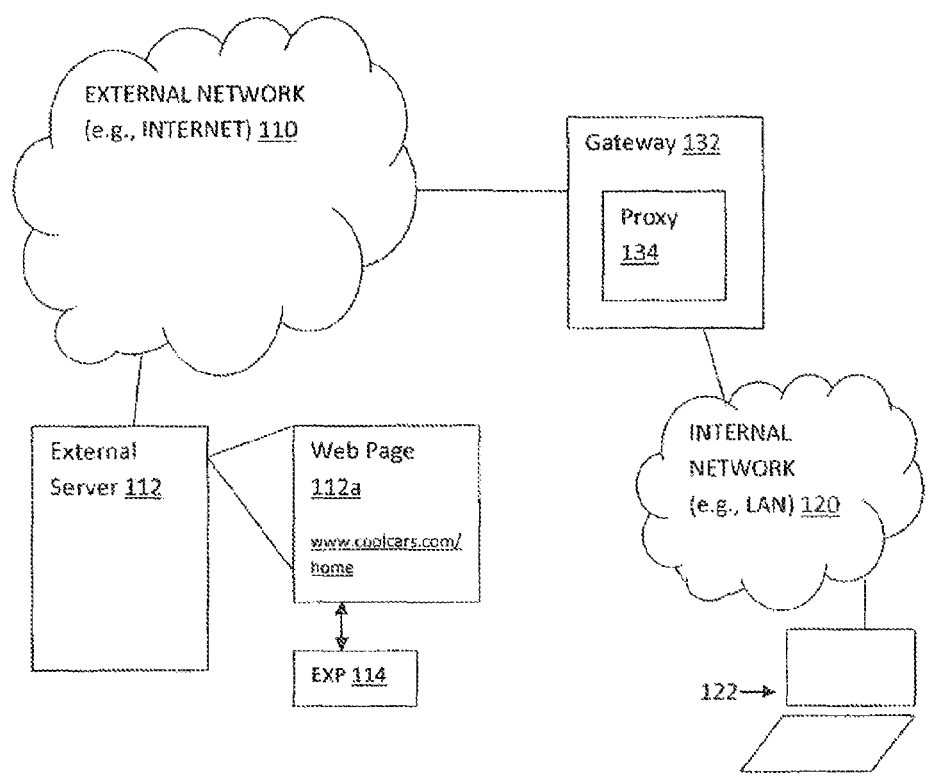
FIG. 2A is a diagram of an exemplary environment in which the present invention operates.

Attention is now directed to FIG. 2A, which shows an exemplary environment 100 in which the present invention operates. The environment 100 is divided into an External Network 110 and Internal Network 110, linked to each other via a gateway 130. The gateway 130 includes one or more servers 132, computers (e.g., main computers), machines, components and the like, including, for example a proxy 134, shown for example, as a computer (including servers), module or component of the gateway server 132. Within the proxy 134 is a library 206' (FIG. 2B), which is injected into HTTP(S) responses from web pages, to which the particular user's browsing application was detected. "Linked" as used herein includes both wired or wireless links, either direct or indirect, and placing the computers, including, servers, components and the like, in electronic and/or data communications with each other.

The external network 110 is, for example, a wide area network (WAN), including public networks, such as the Internet. An external server 112, which hosts a web site (for example, with a Uniform Resource Locator (URL) of www.coolcars.com), with a web page 112a (for example, with a URL of www/coolcars.com/home), which here, for example, contains an exploit (EXP) 114. However, for exemplary purposes, the exploit 114 does not need to be present, as the invention operates on all HTTP(S) responses sent from the server 112.

The internal network 120 is, for example, a local area network (LAN), which, for example, serves an enterprise, and the user computers, represented by the user computer 122. The user computer 122 is linked to this internal network 120. The user computer 122 includes components in both hardware and software including a browsing application or browser 122a and memory 122b, which are referred to by name to illustrate the present invention. The remainder of the user computer 122 is, for example, in accordance with a typical desktop, laptop, tablet computer, smart phone and the like.

The proxy 134 may also be one or more computers, machines, components, or a software program that is part of the gateway server 130 or another server, which separates a local network (e.g., LAN), such as that of an enterprise, from outside networks, such as the Internet or other WAN. The proxy server 134, for example, functions to cache all web pages accessed over the network 50, allowing users who may direct their browser to a particular web page, to access the web page through the proxy server 134. This allows the web page to be loaded onto the user's computer faster and reducing the bandwidth of the network. Should the desired web page not be in the cache of the proxy server 134, the proxy server will access the web page using its own IP (Internet Protocol) address, cache the web page, and render it to the browser, which is accessing the web page.

Figure 2B:
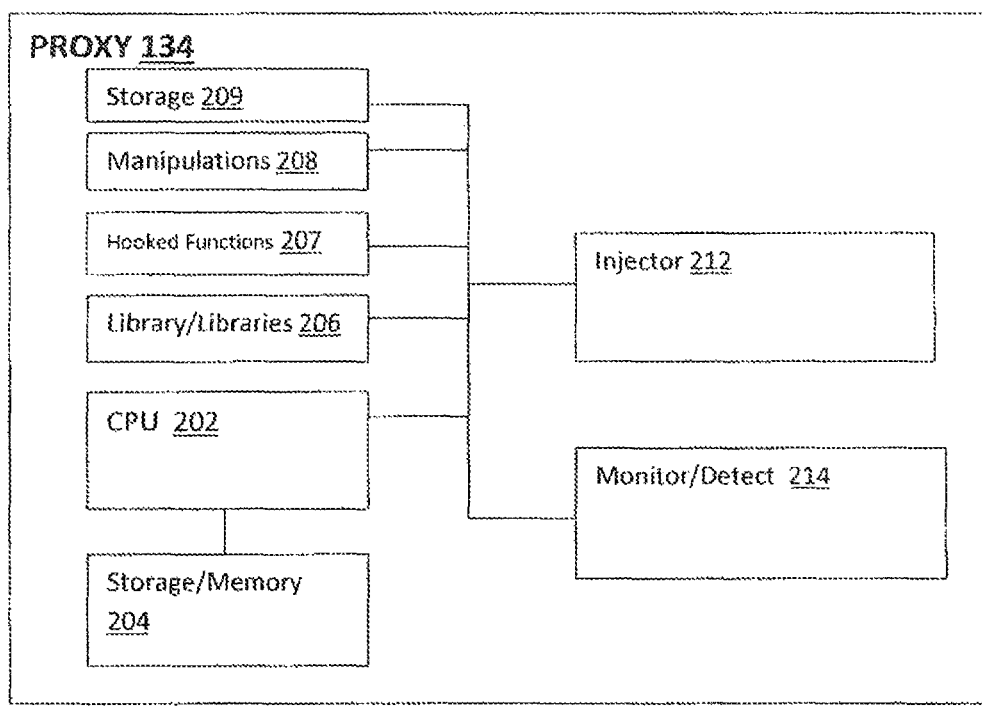
FIG. 2B is an architecture of the gateway in accordance with embodiments of the present invention.

FIG. 2B details the proxy 134, for example, as a proxy server. Only components of the proxy server 134 that are germane to the present invention are shown in FIG. 2B. The proxy server 134 includes a central processing unit (CPU) 202, storage/memory 204 operable with the CPU 202, one or more libraries, e.g., JavaScript libraries, in library storage media 206 for injection into HTTP(S) responses by an injector module 212, storage for predetermined hooked functions 207, storage for manipulations/manipulation techniques 208, and local storage for actual manipulations used 209, and a monitoring/detecting module 214. The library storage media 206, injector module 214, and monitoring/detecting module 214 are in electrical and/or data communication with the CPU 202.

The CPU 202 includes one or more processors. These processors are conventional processors, such as those used in servers, computers, and other computerized devices. For example, the processors may include x86 Processors from AMD and Intel, Xenon® and Pentium® processors from Intel, and other processors Other processors, such as those of the modules 212, 214, may be any of the aforementioned processors.

The storage/memory 204 is any conventional storage. The modules 212, 214 may also include their own storage/memory in addition to the storage memory 204. This storage/memory 204 stores machine executable instructions associated with the operation of the CPU 202, for performing the processes of the invention, for example, the process detailed in the flow diagram of FIGS. 3A and 3B. Also, the storage/memory 204, although shown as a single component for representative purposes, may be multiple components, and may be outboard from the proxy 134.

The libraries, represented by library 206', stored in the library storage media 206, for example, include libraries with JavaScript code. When this code executes on the client side, for example, at user computers, such as user computer 122, the JavaScript code hooks some predetermined functions, as detailed further below.

The storage media 206, 207, 208, 209, as well as modules 212, 214 may be programmed by a system administrator.

The monitoring/detecting module 214 monitors HTTP(S) responses and determines, for example, by applying rules and policies, which HTTP(S) responses should be injected with a particular library (from the library storage 206), by the injector module 212.

Figure 3A:
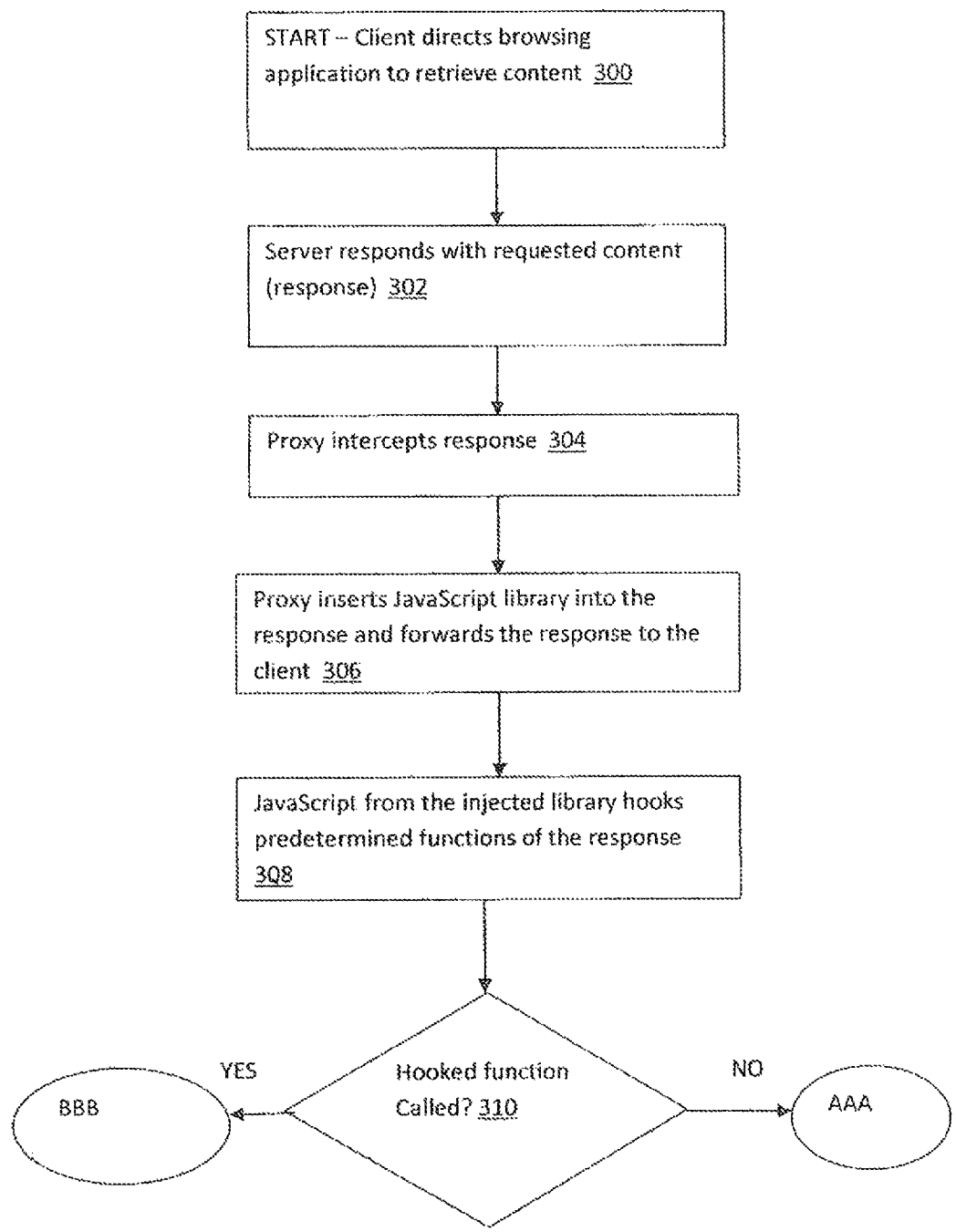
FIGS. 3A and 3B are a flow diagram detailing a process in accordance with the present invention; and, FIGS. 4A and 4B are diagrams of an exemplary client computer memory subjected to a process of embodiments of the invention.
Figure 3B:
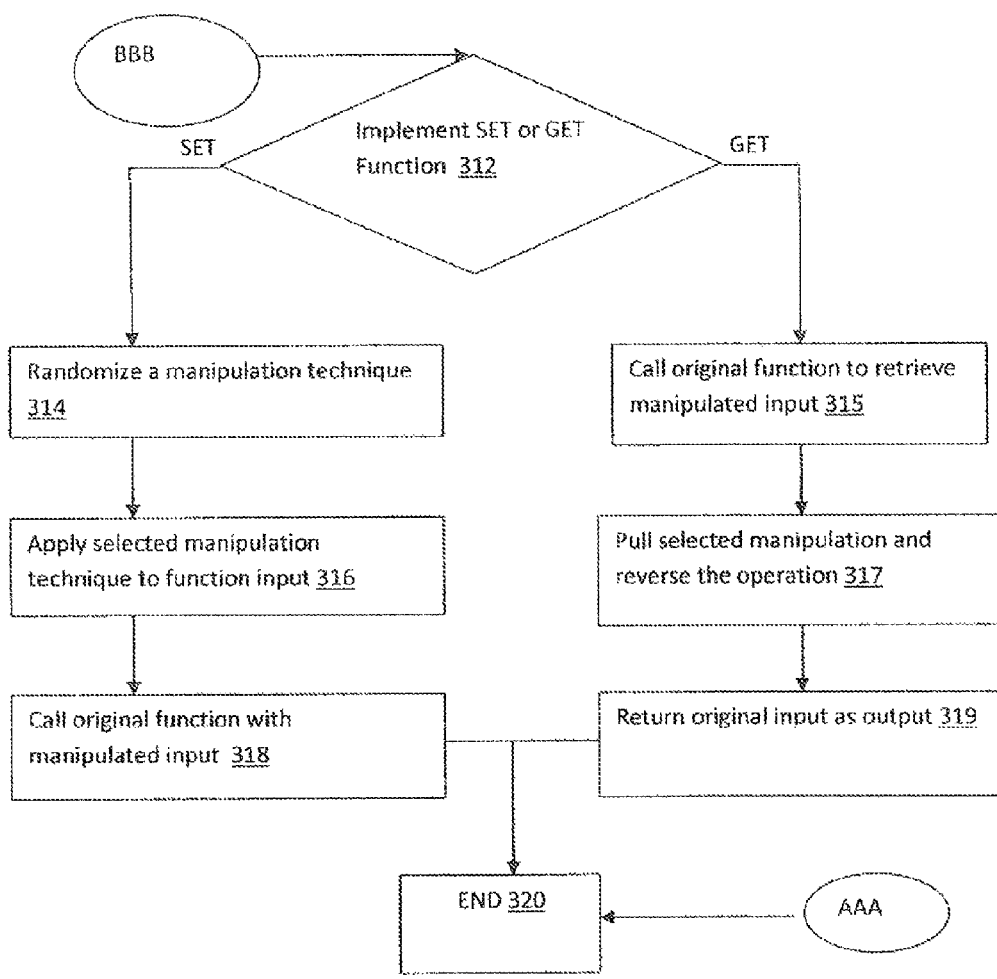

Attention is now directed to FIGS. 3A and 3B which show a flow diagram detailing a computer-implemented process in accordance with embodiments of the disclosed subject matter. Reference is also made to elements shown in FIGS. 2 and 2B. The process and subprocesses of FIGS. 3A and 3B are computerized processes performed, for example, by the proxy 134 as it acts on the user or client computer 122 (also referred to as the "client"). The aforementioned processes and sub-processes can be, for example, performed manually, automatically, or a combination thereof, and, for example, in real time.

Initially, at block 300, the START block for the process, the client, for example, the user, via user (client) computer 122 has surfed, e.g., directed his browser (browsing application). Internet Explorer™ from Microsoft, Chrome™ from Google, and Firefox™ from Mozilla, to a server 112, which hosts a web page 112a of web site, to request and retrieve the content of the web page 112a. The browser direction includes an HTTP(S) request directed to the uniform resource locator (URL) of the intended web site, for example www.coolcars.com, and in particular, the web page, e.g., the home page, with the URL www.coolcars.com/home. The server 112 responds to the content request, at block 302, by providing a response to the browser request, for example in HTTP(S) format, which includes the requested content, e.g., web page.

The proxy 134 monitors this HTTP(S) response as it enters the gateway 132 and detects it, such that the HTTP(S) response is intercepted, at block 304. The process moves to block 306, where the proxy 134 inserts (injects) a JavaScript library into the HTTP(S) response, and forwards (transmits) that HTTP(S) response to the client 122. The JavaScript from the injected library hooks predetermined functions of the response, at block 308. The functions which are considered predetermined functions are, for example, those set by the system, system administrator and programmed into the storage 207. Some exemplary functions which are hooked, include arrays (push/pop), and strings (insert/remove).

The process moves to block 310, where it is determined whether the hooked function is called. If not called, the process moves to block 320, where it ends. Should the hooked function be called, the proxy CPU 202 determines whether the called hooked function is to be implemented as a SET or GET function. The SET function typically involves a manipulation to destroy or break an exploit from the HTTP(S) response, which is now running in the client computer 122, while a GET function acts as a restore, which is now running in the client computer 122e, by repairing or restoring the memory.

Should a SET function be determined from the called hooked function, a manipulation technique, stored, for example, in the storage media 208 is randomly selected by the CPU 202, at block 314. This random selection is made, so that attackers have an extremely low likelihood of correctly determining the actual manipulation, which is selected for use. The manipulations, as stored in the storage media 208, and randomly selected include, for example, bit flipping-switching between bits, string reordering—e.g., reversing strings, KANSAS to SASNAK, array swapping-using a command such as: Swap(Arr[i],Arr[j]), and asynchronous defragmentation-using a command such as: setInterval( )+Dummy Allocations+Garbage Collection. The selected manipulation technique is then stored in storage media 209, for example, in a database.

The process moves to block 316, where the selected manipulation technique is applied to the function input. For example, as shown in FIGS. 4A and 4B, before the selected array swapping (exchanging) manipulation technique is applied, the JavaScript code is:
Var arr=new Array( );
Arr[0]="nop+shellcode";
and the memory 400 is as shown in FIG. 4A, with arrow 402 pointing to the code segment "90909090", and arrow 403 pointing to the code segment "4e249090". With the arrays swapped (exchanged), as shown in the memory 400 FIG. 4B, the JavaScript code is:
Var arr=new Array( );
nset(arr,0,"nop+shellcode")
where code segment "90909090" (arrow 402' in FIG. 4B) was swapped with code segment "15b03570" (arrow 404 in FIG. 4A and arrow 402" in FIG. 4B), and code segments "4e249090" of arrows 403 in FIG. 4A and 403' in FIG. 4B, swapped with the code segment "90a9d485" (arrow 405 of FIG. 4A and 405' of FIG. 4B).

The process moves to block 318, where the CPU 202 calls the original function with the manipulated input. This typically results in a browser crash, since the attacker made an assumption regarding the state and content of the memory which the library broke. The process moves to block 320, where it ends.

Turning back to block 312, the GET functionality is now addressed. The process moves to block 315, where the original input function is called to retrieve the manipulated input. The process then moves to block 317, where the selected manipulation that was chosen at block 314 is saved locally, for example, in storage media 209, and the operation is reversed. It is here, where the memory is typically restored or repaired.

The process moves to block 319, where the original input is returned as output for the manipulated function, e.g., the code segment "SASNAK" is returned to "KANSAS". This operation has repaired/reverted the manipulation, so the output returns as would be expected by the user. The process moves to block 320, where it ends.

In both cases, at blocks 318 and 319, the browser crash occurs, without damage or compromise to the memory of the client computer. However, there is not always a browser crash, depending on the function input. As a result of this activity, the user experience is preserved.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method for preventing browser-based memory corruption in computers comprising:
   monitoring HTTP responses transmitted over a network from a web page to which the browser associated with a computer has been directed; and,
   injecting a library, into an HTTP response, to modify the HTTP response to mitigate attacks on the memory of the computer, the injected library for hooking predetermined functions in the HTTP response, and, when the hooked function is a SET function, the memory is manipulated; and, when the hooked function is a GET function, the memory is repaired.

2. The method of claim 1, wherein the HTTP response includes at least one of an HTTP response or an HTTPS response.

3. The method of claim 1, wherein the library includes a scripting language library.

4. The method of claim 1, wherein the injecting the library is performed by a proxy.

5. The method of claim 1, wherein the memory is manipulated with manipulations selected from the group consisting of bit flipping, string reordering, array swapping, and asynchronous defragmentation.

6. The method of claim 1, wherein the memory is repaired includes the memory being restored.

7. A computer usable non-transitory storage medium having a computer program embodied thereon for causing a suitable programmed system to preventing browser-based memory corruption in computers accessible via a network, by performing the following steps when such program is executed on the system, the steps comprising:
   monitoring HTTP responses transmitted over a network from a web page to which the browser associated with a computer, accessible via the network, has been directed; and,
   injecting a library into an HTTP response to modify the HTTP response to mitigate attacks on the memory of the computer, wherein the injected library hooks predetermined functions in the HTTP response; and, when the hooked function is a SET function, the memory of the computer is manipulated, and when the hooked function is a GET function, the memory of the computer is repaired.

8. The computer usable non-transitory storage medium of claim 7, wherein the HTTP response includes at least one of an HTTP response or and HTTPS response.

9. The computer usable non-transitory storage medium of claim 7, wherein the library includes a scripting language library.

10. The computer usable non-transitory storage medium of claim 7, wherein the memory manipulations are selected from the group consisting of bit flipping, string reordering, array swapping, and asynchronous defragmentation.

11. The computer usable non-transitory storage medium of claim 7, wherein the memory repaired includes the memory being restored.

12. A server for linking to a network, the server for preventing browser-based memory corruption in client computers linked to the network, comprising:
   at least one library to modify at least one of an HTTP response or an HTTPS response, the at least one library for hooking predetermined functions in the at least one HTTP response or HTTPS response, the at least one library sent to a client computer over the network, to mitigate attacks on the memory of the client computer; and,
   a processor for executing computer components, the computer components comprising:
      a first component for intercepting at least one of an HTTP response or an HTTPS response, sent to a client computer over the network; and,
      a second component for injecting the at least one library into the at least one HTTP response or an HTTPS response, such that the at least one library hooks predetermined functions in the at least one HTTP or HTTPS response; and, when the hooked function is a SET function, the memory of the computer is manipulated, and when the hooked function is a GET function, the memory of the computer is repaired.

13. The server of claim 12, wherein the library includes a scripting language library.

14. The server of claim 12, configured for operating as a proxy.

* * * * *